United States Patent
Broholm et al.

(10) Patent No.: US 11,375,667 B2
(45) Date of Patent: Jul. 5, 2022

(54) CONCAVE ADJUSTMENT SYSTEM IN A COMBINE HARVESTER TWIN AXIAL-FLOW CROP PROCESSOR

(71) Applicant: AGCO International GmbH, Neuhausen (CH)

(72) Inventors: Brian Broholm, Randers (DK); Alastair Cameron Morrison, Randers (DK)

(73) Assignee: AGCO International GmbH, Duluth, GA (US)

( * ) Notice: Subject to any disclaimer, the term of this patent is extended or adjusted under 35 U.S.C. 154(b) by 263 days.

(21) Appl. No.: 16/650,612

(22) PCT Filed: Aug. 24, 2018

(86) PCT No.: PCT/EP2018/072866
§ 371 (c)(1),
(2) Date: Mar. 25, 2020

(87) PCT Pub. No.: WO2019/063218
PCT Pub. Date: Apr. 4, 2019

(65) Prior Publication Data
US 2020/0221642 A1 Jul. 16, 2020

(30) Foreign Application Priority Data
Sep. 27, 2017 (GB) ..................... 1715633

(51) Int. Cl.
*A01F 12/28* (2006.01)
*A01F 7/06* (2006.01)
*A01F 12/26* (2006.01)

(52) U.S. Cl.
CPC ............... *A01F 12/28* (2013.01); *A01F 7/06* (2013.01); *A01F 12/26* (2013.01)

(58) Field of Classification Search
CPC ............ A01F 12/28; A01F 12/26; A01F 7/06
See application file for complete search history.

(56) References Cited

U.S. PATENT DOCUMENTS 3,552,396 A * 1/1971 Gerhardt ............. A01D 41/127
460/109
3,631,862 A * 1/1972 Rowland-Hill ......... A01F 12/28
460/109

(Continued)

FOREIGN PATENT DOCUMENTS

DE    40 00 909 A1    8/1990
DE    10 2016 123182 A1    6/2017

(Continued)

OTHER PUBLICATIONS

European Patent Office, International Search Report for Parent International Application No. PCT/EP2018/072866, dated Dec. 17, 2018.

(Continued)

*Primary Examiner* — Alicia Torres
*Assistant Examiner* — Matthew Ian Neal

(57) ABSTRACT

A combine harvester including a frame and two axial-flow crop processing rotors mounted to the frame. An inner support structure is located between the two rotors and is mounted to the frame by a first linkage. Two outer support structures are located outboard of the two rotors and are mounted to the frame by respective second and third linkages. The inner support structure and two outer support structures carry first and second pluralities of concave grate segments at a radial distance from the respective rotors. A concave adjustment system includes a first actuator coupled to the first linkage which is configured to raise and lower the inner support structure. A second actuator is coupled to one (Continued)

of the second and third linkages and is configured to raise and lower at least one of the two outer support structures.

15 Claims, 8 Drawing Sheets

(56) References Cited

U.S. PATENT DOCUMENTS

| | | | |
|---|---|---|---|
| 3,949,761 A | 4/1976 | Mortier et al. | |
| 4,031,901 A * | 6/1977 | Rowland-Hill | A01F 12/24 460/108 |
| 5,190,497 A * | 3/1993 | Heidjann | A01F 12/28 460/76 |
| 6,358,142 B1 * | 3/2002 | Imel | A01F 12/26 460/109 |
| 6,958,012 B2 * | 10/2005 | Duquesne | A01F 12/28 460/109 |
| 8,157,629 B2 * | 4/2012 | Yanke | A01F 12/28 460/109 |
| 8,628,390 B2 * | 1/2014 | Baltz | A01F 12/24 460/109 |
| 9,980,435 B2 * | 5/2018 | Mackin | A01F 12/28 |
| 10,932,414 B2 * | 3/2021 | Haar | A01F 12/28 |
| 2011/0151951 A1 * | 6/2011 | Regier | A01F 12/28 460/109 |
| 2014/0194170 A1 | 7/2014 | Holtmann et al. | |
| 2016/0316631 A1 * | 11/2016 | Davenport, III | A01F 12/26 |
| 2017/0105351 A1 * | 4/2017 | Matway | A01F 12/28 |
| 2017/0164559 A1 * | 6/2017 | Matousek | A01F 7/062 |
| 2017/0164560 A1 * | 6/2017 | Van Hullebusch | A01F 12/28 |
| 2017/0290263 A1 | 10/2017 | Kemmner | |
| 2019/0150366 A1 * | 5/2019 | Flickinger | A01F 7/02 |
| 2020/0196530 A1 * | 6/2020 | Van Hullebusch | A01F 12/26 |
| 2021/0068344 A1 * | 3/2021 | Biggerstaff | A01F 12/28 |

FOREIGN PATENT DOCUMENTS

| | | |
|---|---|---|
| EP | 3 178 309 A1 | 6/2017 |
| FR | 2250467 A1 | 6/1975 |
| WO | 2016/055364 A1 | 4/2016 |

OTHER PUBLICATIONS

UK Intellectual Property Office, Search Report prepared for Priority Application No. 1715633.2, dated Mar. 28, 2018.

* cited by examiner

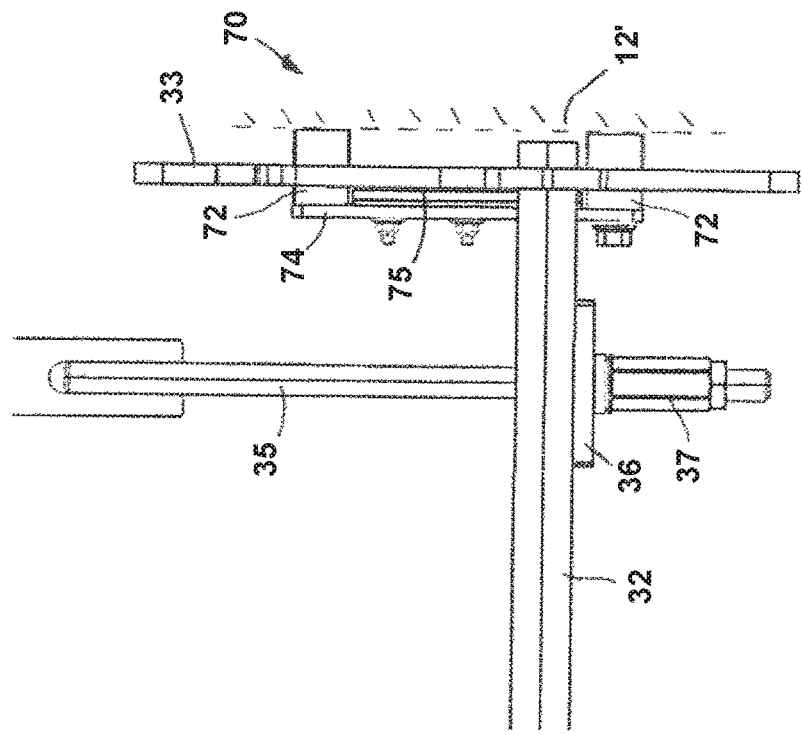
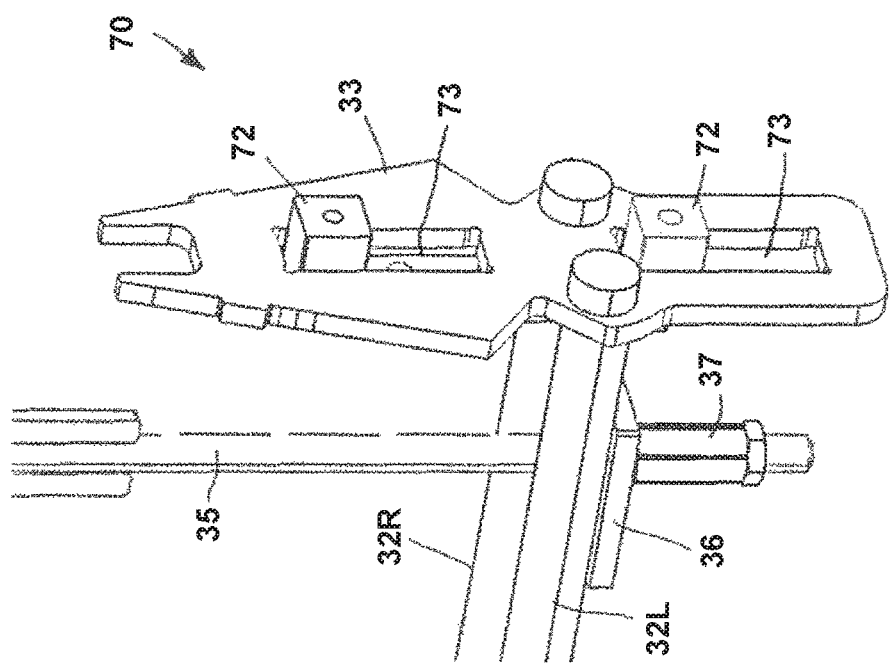

CONCAVE ADJUSTMENT SYSTEM IN A COMBINE HARVESTER TWIN AXIAL-FLOW CROP PROCESSOR

FIELD

The present disclosure relates to combine harvesters that include a twin-rotor, axial-flow, crop processor for threshing and/or separating cut crop material. In particular, the disclosure relates to a concave adjustment system for adjusting a clearance between a concave and an associated rotor at both a material inlet side and a material outlet side.

BACKGROUND

Twin axial-flow or rotary combine harvesters usually have a pair of crop processing rotors each arranged side-by-side and each having a rotation axis which is substantially parallel to the longitudinal axis of the harvester. The rotors usually perform both the threshing and separating action upon the cut crop flow delivered thereto.

Each crop processing rotor is mounted in a respective rotor housing which is generally cylindrical and which includes an arcuate grate or concave in the lower section to allow separated grain to fall onto an underlying collection pan. Enclosing curved cover plates are provided in an upper section of the housing.

Crop material is fed into a front inlet section, where the crop material is engaged by flighting elements on the rotor. The crop material is conveyed as a ribbon or mat in a generally rearward axial and helical path in the space between the rotor and the rotor housing. Axial conveyance of the crop material is driven by the interaction between guide vanes provided on the inside surface of the upper cover plates and threshing and separating elements provided on the rotor. Threshing of the crop material and the subsequent separation of the grain therefrom is mostly carried out in the lower portions of the helical path by the interaction between the threshing and separating elements respectively and the concave, the clearance between which is adjustable. Separated crop material passes by gravity through the grate whereas the longer bulkier straw residue is conveyed via an outlet or discharge section at the rear of the housing.

To obtain the most effective threshing, it is important to regulate and maintain the optimum clearance between the concave and the threshing elements on the rotors during operation. The optimum separation depends upon the crop being harvested and the conditions at the time of harvest. A concave clearance that is too small will result in grain damage, whereas an excessive concave clearance will tend to reduce the threshing effectiveness, leading to losses.

A concave for a conventional rotary processor is usually fixed relative to the rotor along one side, wherein adjustment of the clearance is performed by moving the opposite side by an appropriate connected linkage. The adjusted side of the concave typically corresponds to the side where the crop material enters the concave region, the crop inlet side.

Due to the arcuate profile of the rotor envelope and the concave, such single-sided adjustment offers limited scope to deliver the optimum clearance, and these downsides are recognized. Attempts have been made to offer concave adjustment systems that adjust the clearance by movement of both the crop inlet and outlet sides. For example, German Patent Publication DE 40 00 909 A1, published Aug. 23, 1990, discloses an adjustment mechanism in which both the inlet and outlet sides of the concave are adjusted.

There is a need for a concave adjustment mechanism that offers the advantages of a dual-sided adjustment system for a twin-rotor processor that is simple in construction and robust during operation.

BRIEF SUMMARY

According to one embodiment, there is provided a combine harvester comprising a frame,
two axial-flow crop processing rotors mounted to the frame and arranged side-by-side and each having a longitudinal rotation axis; an inner support structure located between, and extending parallel to, the two rotors, the inner support structure being movably mounted to the frame by a first linkage; two outer support structures located outboard of, and extending parallel to, the two rotors, the support rails being movably mounted to the frame by respective second and third linkages; wherein the inner support structure and two outer support structures are configured to carry first and second pluralities of concave grate segments at a radial distance from the respective rotors; and, a concave adjustment system comprising a first actuator coupled to the first linkage and configured to raise and lower the inner support structure, and a second actuator coupled to one of the second and third linkages and configured to raise and lower at least one of the two outer support structures.

The combine harvester comprises an inner support structure between two outer support structures, which structures support concave segments therebetween. The inner support structure and the outer support structures can be adjusted up and down to adjust the concave clearance along both the crop inlet and crop outlet sides.

The first linkage serves to carry the inner support structure upon the frame and, in one embodiment, comprises fore and aft arms that are pivotally mounted to the frame for movement around respective transverse pivot axes. A distal end of each of the fore and aft arm is connected to the inner support structure by a hanger. The first actuator is connected between the frame and one of the fore and aft arms to control movement of the arms and thus up and down movement of the inner support structure and concave segments supported thereon.

The inner support structure may be slidingly connected to the frame by a vertical guide mechanism which constrains horizontal displacement of the inner support structure. A guide mechanism may be positioned at one or both ends of the inner support structure to prevent sideways of lateral movement of the support structure with respect to the frame, ensuring that the support structure has freedom only in the vertical direction and only for adjustment purposes.

In another embodiment, the second linkage and the third linkage each comprise a rockshaft mounted to the frame aligned substantially parallel to the rotation axis. First and second cranks are keyed to the rockshaft and coupled to the associated outer support structure by respective hangers. The second actuator may be connected between the frame and a third crank, which is keyed to one of the rockshafts. The third crank may be formed integral with the first crank to provide an elbow member that is keyed to the rockshaft.

In yet another embodiment, the second linkage is coupled mechanically to the third linkage. As such, the two outer support structures (and concave sides connected thereto) move up and down in unison and can be controlled together by the second actuator. However, in another embodiment, movement of the two outer support structures is controlled independently. In this embodiment, a third actuator is connected between the frame and the third linkage, leaving the second actuator to control the second linkage only. Advantageously, the concave clearance for each rotor can then be controlled independently.

The first actuator preferably extends along a first axis that resides in a vertical longitudinal plane, or in other words, in a fore and aft direction. The second actuator (and third actuator if provided) preferably extends along respective axes that resides in a vertical transverse plane, or in other words transversely to the rotor axes.

When installed, the concave grate segments are preferably hinged at an inboard side to the inner support structure and secured at an outboard side to one of the two outer support structures. The inner support structure preferably comprises a pair of laterally spaced-apart rails upon which hooks provided in the concave segments simply engage. The outer sides of the concave segments may be secured to the outer support structures in a host of different ways including, by way of example only, by bolts, clips, or pins.

The disclosure lends itself well to twin rotor processors regardless of the direction of rotation of the rotors. However, in a certain embodiment, the two rotors are driven in mutually opposite directions wherein an inboard side of the rotors turn upwardly, meaning that the outboard sides of the concave grate segments correspond to a concave inlet and the inboard sides of the concave grate segments correspond to a concave outlet.

The actuators may be hydraulic, electric, or pneumatic. Hydraulic actuators present the option to allow for simple overload functionality which accommodates slugs of material passing through the processor by allowing an instantaneous increase in concave clearance. Hydraulic relief valves may be provided in conjunction with hydraulic actuators to provide such overload functionality.

BRIEF DESCRIPTION OF THE DRAWINGS

Further advantages will become apparent from reading the following description of specific embodiments with reference to the appended drawings, in which:

FIGS. 6 and 7 are an enlarged perspective and side views respectively of one end of the inner support structure including the vertical guide associated therewith;

DETAILED DESCRIPTION

An example embodiment will now described. Relative terms such as 'front', 'rear', 'left', 'right', 'vertical', 'horizontal', 'longitudinal', and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial', and 'tangential' will be used in relation to the rotation axis of the processing rotors.

Figure 1:
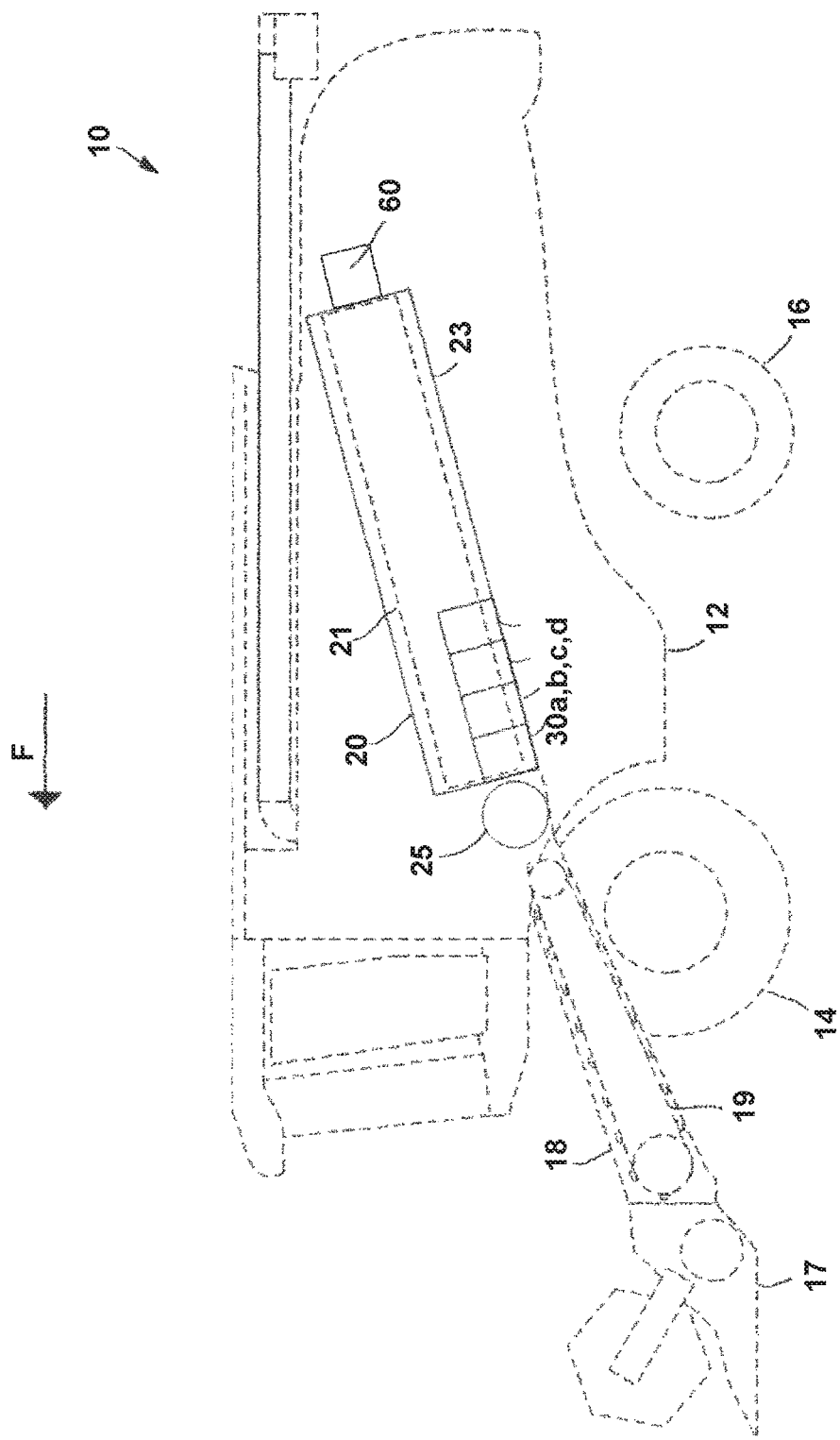
FIG. 1 is schematic side view of a combine harvester that includes a twin rotor crop processor.

With reference to FIG. 1, a combine harvester 10 includes a frame or chassis 12, front wheels 14, and rear steerable wheels 16. A cutting header 17 is detachably supported on the front of a feederhouse 18, which is pivotable about a transverse axis to lift and lower the header 17 in a conventional manner.

The combine 10 is driven in a forward direction F across a field of standing crop in a known manner. The header 17 serves to cut and gather the crop material before conveying such into the feederhouse 18 and an elevator 19 housed therein. At this stage the crop stream is unprocessed. It should be understood that combine harvesters are employed to harvest a host of different crops including cereal, rice, corn, and grass seed. The following description will make reference to various parts of the cereal crop stream, but it should be understood that this is by way of example only and does not by any means limit the applicability of the disclosure to harvesting other crops.

The cut crop stream is conveyed rearwardly from the feederhouse 18 to a processor designated generally at 20. The processor 20 includes a pair of axial flow threshing and separating rotors 21, 22, which are each housed side-by-side inside a respective rotor housing 23 and are fed at their front end by a feed beater 25. The rotors serve to thresh the crop stream in a front 'threshing' region, separate the grain therefrom in a rear 'separating' region, and eject the straw residue through the rear of the machine either directly onto the ground in a windrow or via a straw chopper.

Each rotor housing 23 is generally cylindrical and is made up of an opaque upper section and a foraminous lower section, which includes a set of side-by-side arcuate concave grate segments that allow the separated material to fall by gravity onto a grain collection pan located below for onward conveyance to a cleaning system (not shown). Guide vanes (not shown) are secured to the inside of the rotor housing and serve, in conjunction with the crop engaging elements on the rotor, to convey the stream of crop material in a generally rearward spiral path from front to rear.

The sets 30, 31 of concave grate segments (see also FIG. 10) are positioned underneath the respective rotors 21, 22 and wrap around a portion of the cylindrical swept envelope 21', 22'. The individual concave grate segments 30a-d, 31a-d are carried upon support structures that are movably mounted to the frame 12 so as to allow adjustment of the clearance between the segments 30a-d, 31a-d and the rotors 21, 22.

Figure 2:
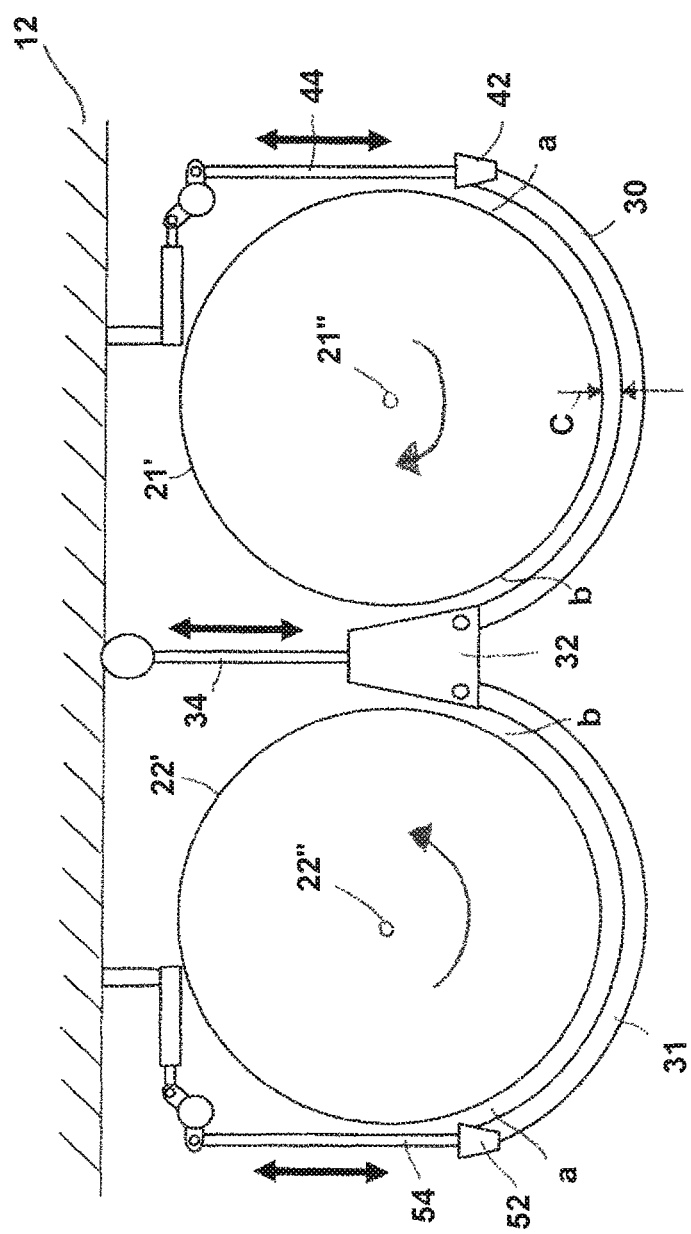
FIG. 2 is a schematic front view of the twin rotor processor of FIG. 1 and showing the concave adjustment system.

FIG. 2 illustrates the concave support structure and concave adjustment system in schematic form, whereas FIGS. 4 through 11 show the concave adjustment system in more detail. With reference to FIG. 2, the swept envelopes 21', 22' of the two crop processing rotors 21, 22, are shown. The rotors 21, 22, are arranged side-by-side and each have a substantially longitudinal, or fore and aft, rotation axis 21", 22".

An inner support structure 32 is positioned between the two rotors 21, 22 and is movably mounted to the frame 12 by a first linkage 34. Two outer support structures 42, 52 are located outboard of the two rotors 21, 22 and are movably mounted to the frame 12 by respective second and third linkages 44, 54.

The sets of concave grate segments 30, 31 are carried by the inner support structure 32 and two outer support structures 42, 52 at a radial distance C from the respective rotors 21, 22. An adjustment system is provided to control movement of the concave grate segments 30, 31, and will be discussed in more detail below.

It should be understood that the frame 12 is represented in simple schematic form in the drawings. In practice, the frame 12 may comprise any component of the vehicle chassis that is fixed with respect to the engine, for example. Although such level of detail is not illustrated, the frame 12 typically comprises longitudinal stringers and rigidifying cross-members therebetween. The rotors 21, 22, associated rotor housing, and concave linkages 34, 44, 54 may be supported by such cross-members and/or transverse bulkheads secured (by welding for example) thereto. A person of ordinary skill will appreciate that the frame 12 may be constructed in a host of different ways.

Turning back to FIG. 2, hydraulic actuators are coupled to the respective linkages 34, 44, 54 to raise and lower the inner and outer support structures 32, 42, 52 and, as a result, adjust the concave clearance C. A rotor drive system, represented generically at 60 (FIG. 1) is operable to drive the rotors 21, 22 in mutually opposite directions. Viewed from the front, the left-hand rotor 21 rotates clockwise (as indicated by the arrow) and the right-hand rotor 22 rotates counterclockwise. As such, the inboard side of the rotors 21, 22 turn upwardly. However, it should be appreciated that the rotors 21, 22 may be operable to rotate in the opposite direction to that described.

The crop material enters the spaces between the concave grate segments 30, 31 and the rotors 21, 22 along the outboard side 'a' and exits along the inboard side 'b'. The concave adjustment system advantageously permits independent adjustment of the concave clearance C along the concave "inlet" side 'a' and along the concave "outlet" side 'b', thus catering for different crops and harvesting conditions with more flexibility.

Figure 3:
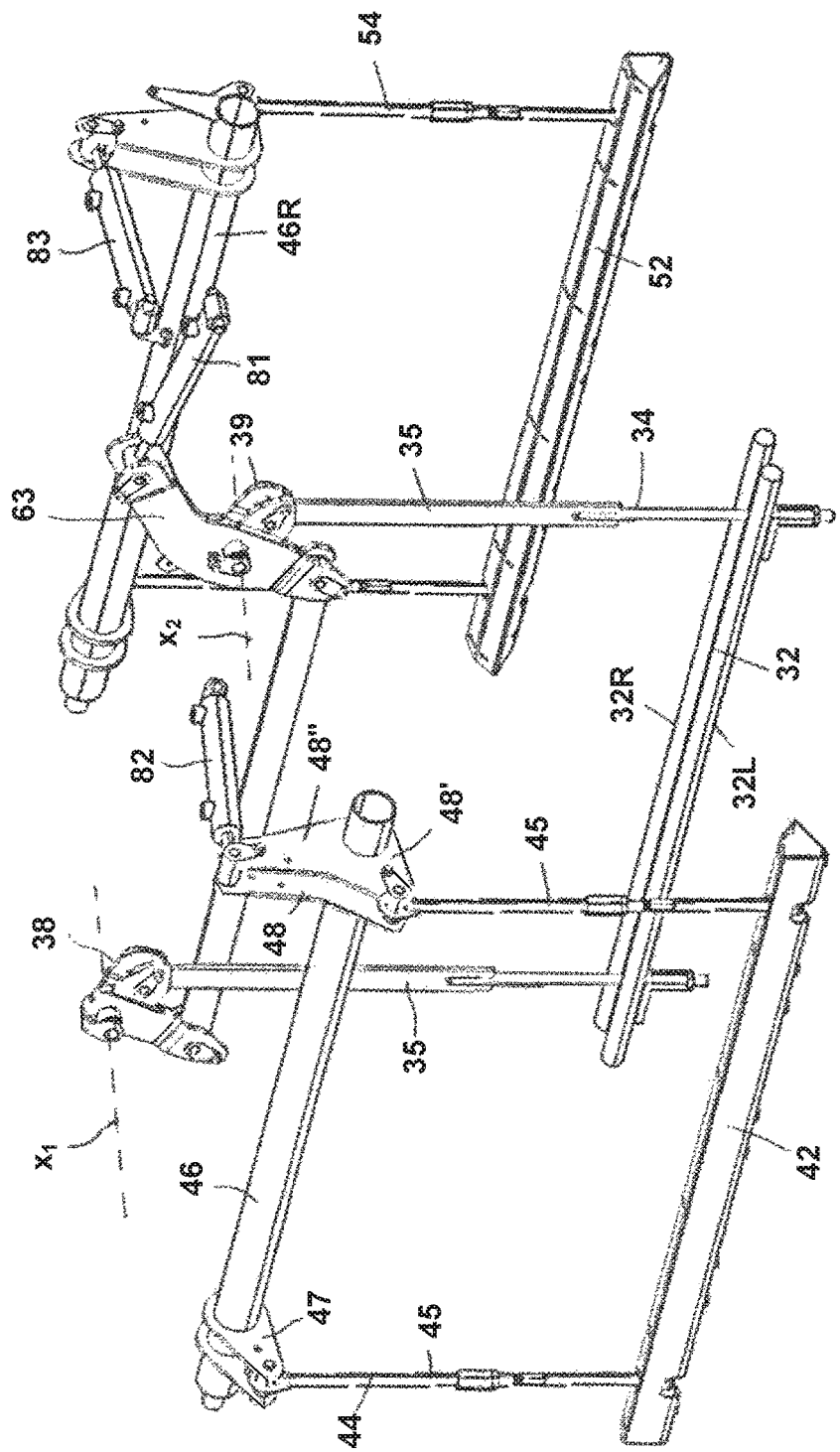
FIG. 3 is a perspective rear view of a concave adjustment system, shown in isolation without the rotors or frame.
Figure 4:
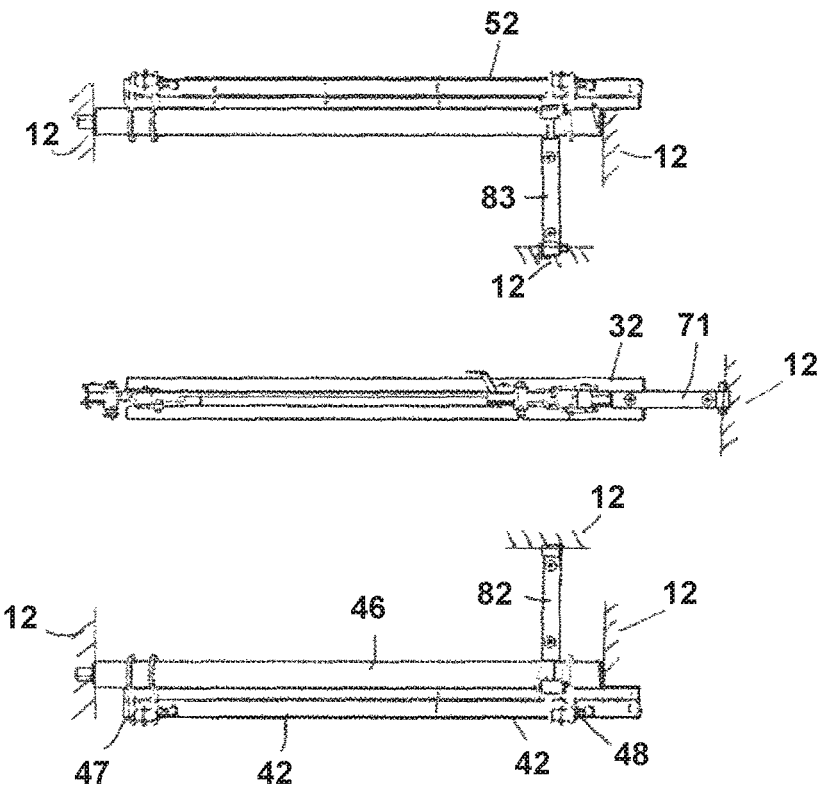
FIG. 4 is a top view of the concave adjustment system of FIG. 3.
Figure 5:
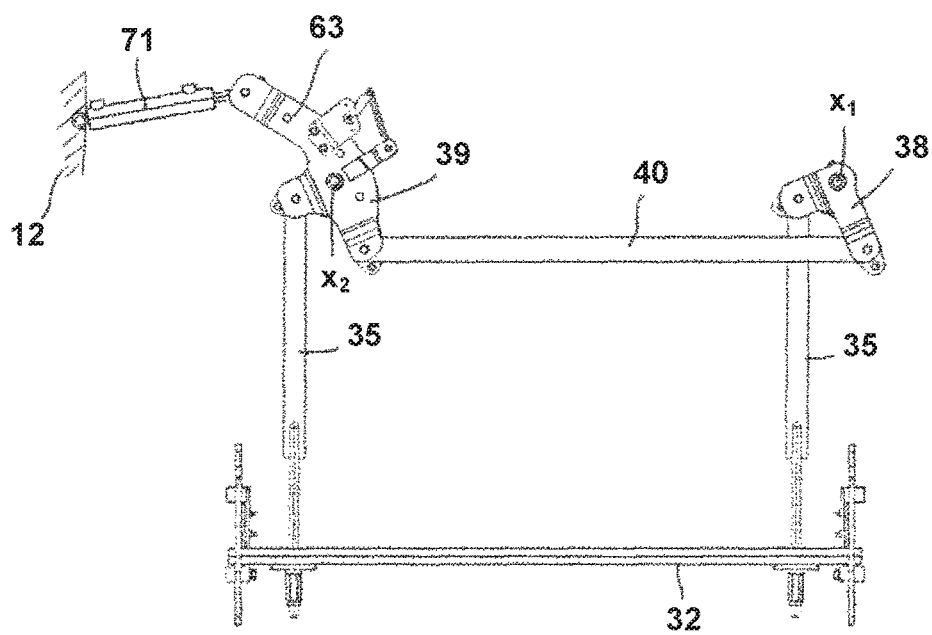
FIG. 5 is a side elevation view of the inner support structure and associated parts of the concave adjustment system shown in FIG. 3.

The support structures 32, 42, 52 and the concave adjustment system are shown in more detail in FIGS. 3 and 4. The inner support structure 32 and corresponding part of the adjustment system are shown in isolation in FIGS. 5 through 8. The inner support structure 32 in the illustrated embodiment comprises a pair of longitudinal rails 32R, 32L, each having a round section and being held together in a spaced-apart relationship by a plurality of spacer plates 33, one of which is shown in FIGS. 6 and 7, the others being omitted.

The inner support structure 32 is suspended from the frame 12 by the first linkage 34, which includes a pair of vertical hanger rods 35, one fore and one aft, which each pass between the rails 32R, 32L and hold a support washer 36 secured to the lower end of the respective hanger rod 35 by a locking nut 37. The weight of the rails 32R, 32L, and the concave segments 30a-d, 31a-d carried thereon, is therefore carried upon the washers 36.

Figure 10:
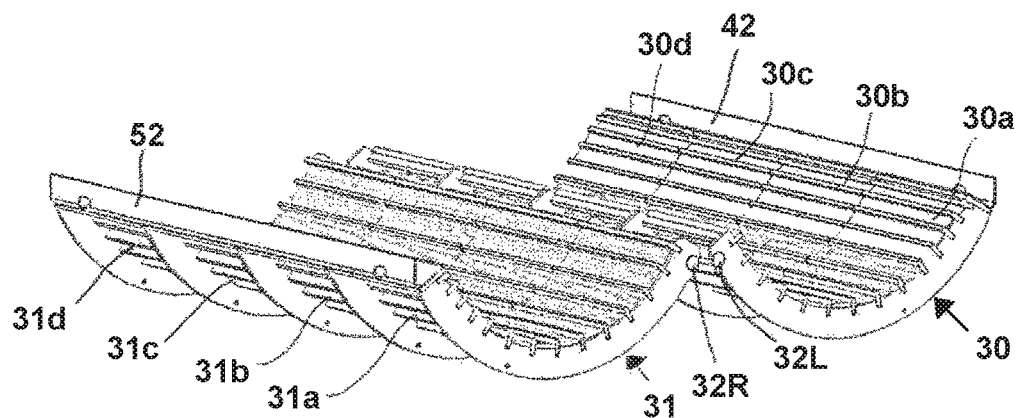
FIG. 10 is a perspective view of the sets of concave grate segments mounted to the inner and outer support structures.
Figure 11:
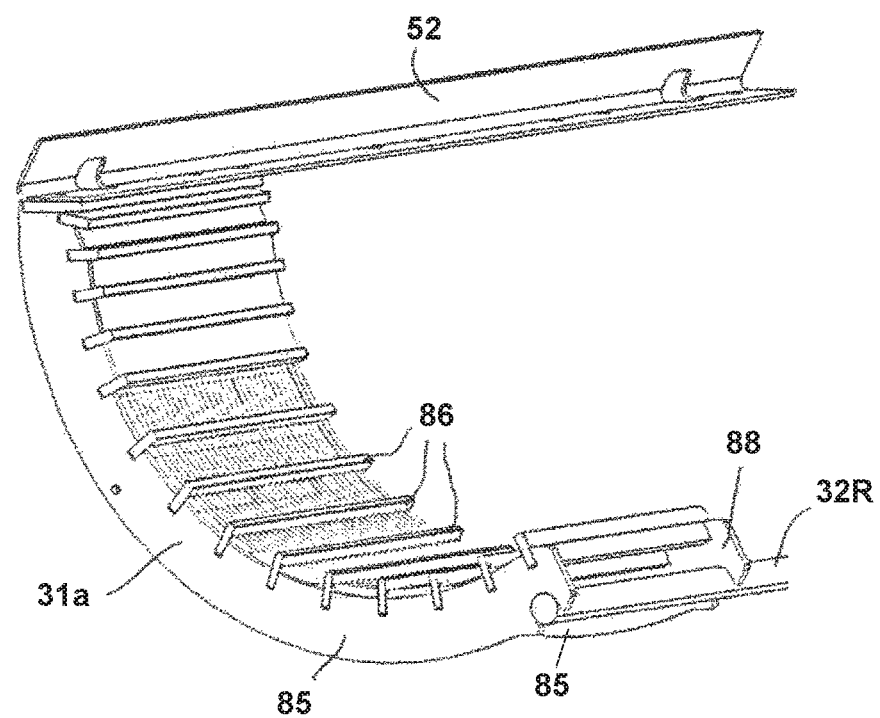
FIG. 11 is a perspective view of one concave grate segment shown mounted to the inner and outer support structures; and, FIG. 12 is a diagrammatic view of a concave adjustment system.

Turning briefly to FIGS. 10 and 11, the inboard side of all right-hand concave segments 30a-d is hinged to rail 32R. The inboard side of all left-hand concave segments 31a-d is hinged to rail 32L. Best seen in FIG. 11 which shows only one concave segment 31a, each segment comprises a pair of mutually spaced arcuate plates 85, which are bridged by a series of grate bars 86 as in known machines. The inboard side of the arcuate plates is provided with a cut-out or hook 88, which engages the associated rail 32R or 32L.

Although shown being simply supported upon the support washers 36 and having freedom to lift away therefrom, the inner support structure 32 may be secured to the hangers 35 in other ways.

The hanger rods 35 are pivotally connected at their upper ends to distal ends of first arms of respective bell cranks 38, 39, which themselves are pivotally mounted to the frame 12 so as to pivot about transverse axes $x_1$, and $x_2$, respectively. Second arms of the bell cranks 38, 39 are coupled together by a longitudinally-extending tie bar 40, which couples adjustment movement at the front of the inner support structure 32 to adjustment movement at the rear.

A first hydraulic cylinder 81 is connected between the frame 12 and a third arm 63 of aft bell crank 39. Extension of cylinder 81 translates (via first linkage 34) into raising of the inner support structure 32 and closing of the concave spacing along the crop outlet side 'b'. Retraction of cylinder 81 translates into lowering of the inner support structure 32 and opening of the concave spacing along the crop outlet side 'b'. Although shown as being connected directly to the aft bell crank 39, first hydraulic cylinder 81 could instead be connected to the fore bell crank 38 or directly to any part of first linkage 34.

With reference to FIGS. 6 and 7, a vertical guide mechanism 70 is provided to constrain or limit horizontal or transverse displacement of the inner support structure 32 relative to the frame 12. The vertical guide mechanism 70 includes a pair of vertically spaced stops 72 which are cuboid in shape and secured at an outboard end {relative to the inner support structure 32) to a bulkhead frame member 12' which forms part of the frame 12. A pair of rectangular slots 73 cut into the end space plate 33 receive a respective one of the stops 72 and serve as vertical guides to allow vertical movement of the inner support structure 32 while preventing horizontal movement. The extent of vertical movement is limited by the length of the slots 73. A retaining plate 74 is bolted onto inboard sides of the stops 72. An optional wear pad 75, formed from a resilient material such as rubber, is secured to the retaining plate 75 and is sandwiched between the retaining plate 75 and the end space plate 33.

Although only one vertical guide mechanism 70 is shown and described in detail, it should be appreciated that either one of both of the fore and aft ends of the inner support structure 32 may be provided with such. Furthermore, it should be appreciated that the precise design of the vertical guide mechanism may vary from that illustrated. For example, the stops 72 and slots 73 may be shaped differently to that described.

The adjustment mechanism associated with the outer support structure 42, 52 and corresponding second and third linkages 44, 54 will now be described. A detailed description will be given in relation to left-hand outer support structure 42 and second linkage 44 only. However, it should be appreciated that the same description applies also to right-hand outer support structure 52 and to third linkage also, albeit constructed in a handed (mirror-image) manner.

Referring to FIGS. 3 and 4, the second linkage 44 comprises a longitudinal rockshaft 46 that extends parallel to the rotor axis and is secured to the frame 12. A first crank 47 is keyed to a forward end of rockshaft 46. A bell crank 48 is keyed to an aft end of rockshaft 46.

Left-hand outer support structure 42 is formed from an elongate length of angled steel and is suspended at fore and aft ends from the rockshaft 46 by a pair of hangers 45 pivotally connected at their upper ends to first crank 47 and a second crank 48' provided by a first arm of bell crank 48. The lower end of hangers 45 can be secured to the outer support structure by bolts, pins, or any suitable mechanism.

Turning once again to FIGS. 10 and 11, the concave segments 30*a-d*, 31*a-d* are secured at their outboard end to the respective outer support structures 42, 52 by bolts or other suitable means.

Referring back to FIG. 3, a second hydraulic cylinder 82 is connected between the frame 12 and a second arm 48" of bell crank 46. Retraction of cylinder 82 rotates the rockshaft 46 so as to raise the left-hand outer support structure 42 and close the concave spacing along the crop inlet side 'a' of the left-hand rotor 21. Extension of cylinder 82 translates into lowering of the left-hand outer support structure 42 and opening of the concave spacing along the crop inlet side 'a' of the left-hand rotor 21. Although shown as being connected directly to the bell crank 48, second hydraulic cylinder 82 could instead be connected to a different crank keyed to the rockshaft 46 or directly to any part of second linkage 44.

A third hydraulic cylinder 83 is connected between the frame 12 and the third linkage 54 to control movement of the crop inlet side of the right-hand rotor 22, independently of the left-hand rotor 21.

In another embodiment, the third actuator is omitted and the third linkage is coupled to the second linkage. As such, adjustment of both outer support structures 42, 52 (and the crop inlet sides of both concaves) is mechanically tied.

Turning back to FIG. 4, the first hydraulic cylinder 81 extends in a generally longitudinal direction, or at least along an axis that resides in a virtual vertical longitudinal plane. The second and third cylinders 82, 83 each extend transversely or at least along respective axes that reside in a vertical transverse plane. Such alignment of the cylinders 81, 82, 83 presents a robust arrangement in which the number of coupling components and thus the stresses placed upon the cylinders and couplings by operation of the connected concaves is minimized.

Figure 12:
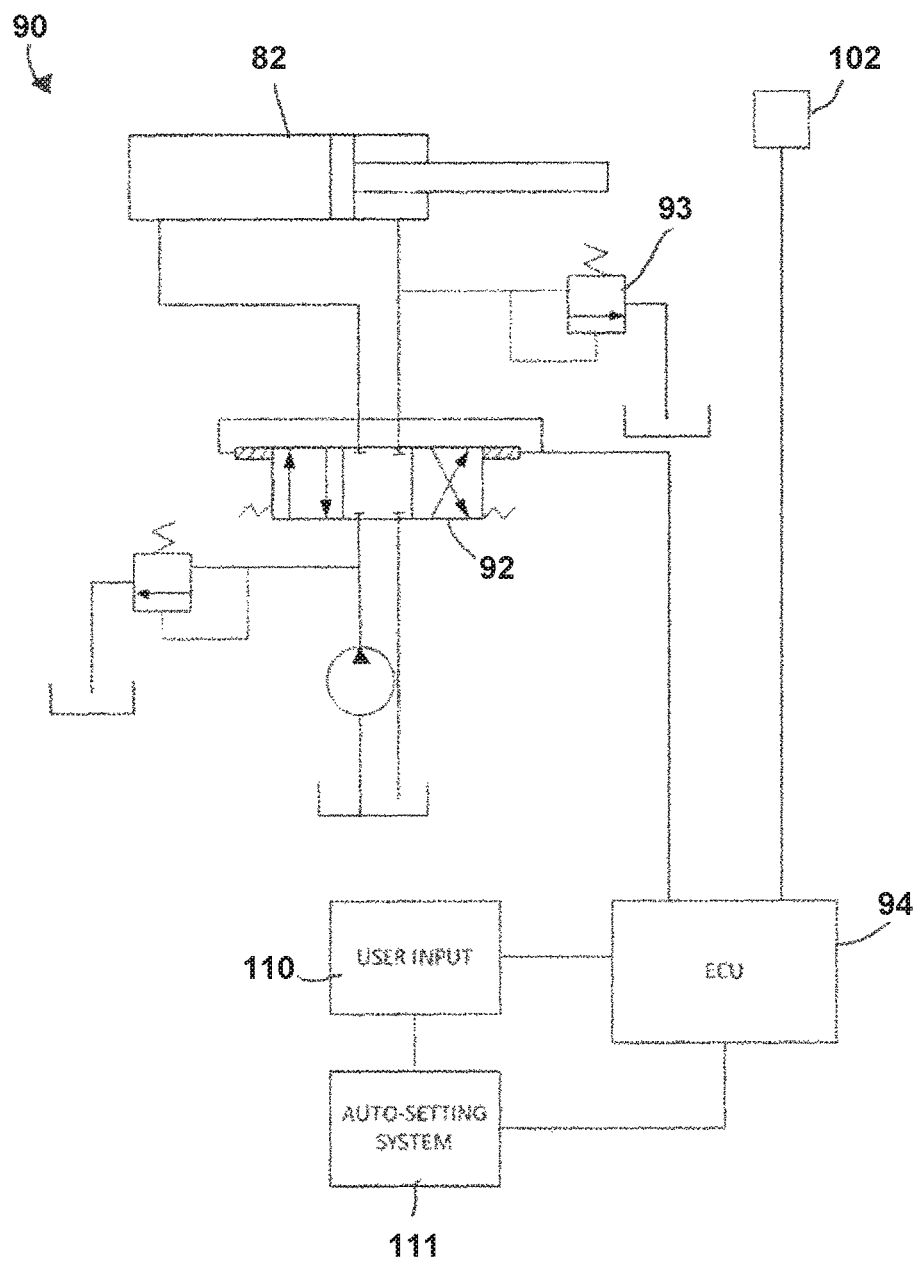

The hydraulic cylinders 81, 82, 83 form part of a hydraulic control system 90, part of which is shown in FIG. 12 in association with second cylinder 82 as an example. Each cylinder 81, 82, 83 has connected thereto a directional control valve 92 to control movement of the cylinder. Furthermore, a relief valve 93 is provided to allow instantaneous extension of the cylinder 82 (retraction in the case of the first cylinder 81) in response to a slug of crop material passing around the concave. The provision of a relief valve for each cylinder allows for overload protection without affecting the concave of the other processing rotor.

The directional control valves 92 are controlled by electrical command signals generated by an electronic control unit (ECU) 94, which may be connected by a wired connection or in communication wirelessly. The ECU 94 generates such command signals in dependence upon the sensed position of the linkages 34, 44, 54. The position of the respective linkages is sensed by respective sensors, examples of which are shown in FIGS. 8 and 9.

Figure 8:
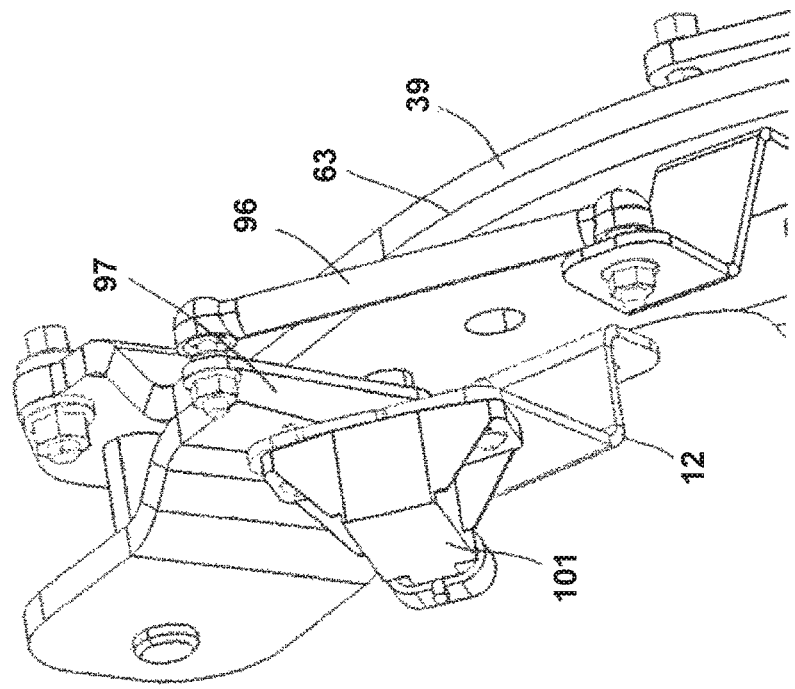
FIG. 8 is an enlarged perspective view of part of the linkage associated with an outer support structure, illustrating the position sensor mounted thereto.

Referring to FIG. 8, a first rotational position sensor 101 is mounted to the frame 12 in the proximity of the aft bell crank 39. An inner sensor linkage comprises a link arm 96 pivotally connected at one end to the third arm 63 of the aft bell crank 39 and at the other end to a crank 97 mounted to a spindle of the sensor 101. Movement of the first linkage 35 is thus translated via the link arm 96 and the crank 97 into rotational movement of the input to the sensor 101, the signal representing such being communicated back to the ECU 94.

Figure 9:
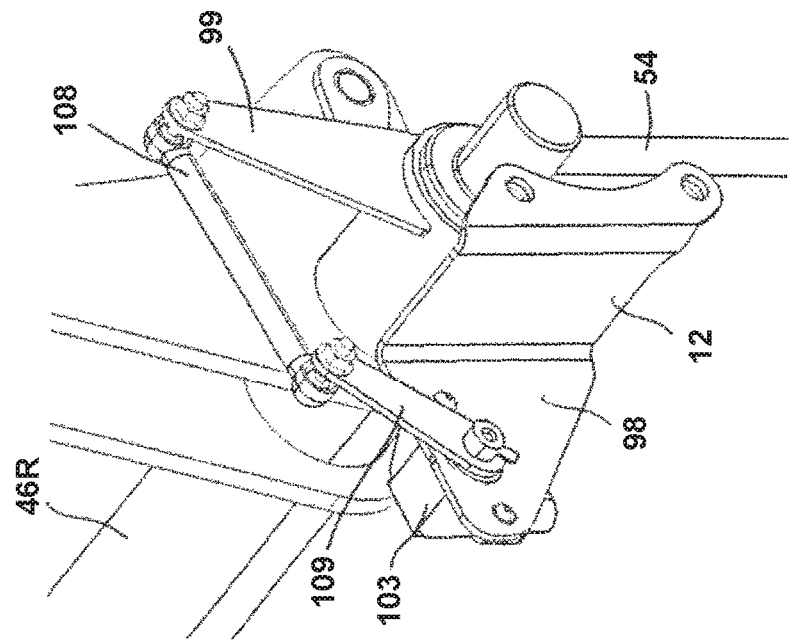
FIG. 9 is an enlarged perspective view of part of the linkage associated with the inner support structure, illustrating the position sensor mounted thereto.

Referring to FIG. 9, a third rotational position sensor 103 is mounted to the frame 12 (by a bracket 98) in the proximity of right-hand rockshaft 46R. An outer sensor linkage comprises a first crank 99 secured to the rockshaft 46R, a link arm 108 and a second crank 109 keyed to the spindle of the sensor 102. Movement of the third linkage 55 is thus translated via the crank 99, the link arm 108 and the crank 109 into rotational movement of the input to the sensor 103, the signal representing such being communicated back to the ECU 94.

It should be understood that a second sensor 102 (FIG. 12) is arranged in a similar manner to sensor 103 in association with the second linkage 44 and the left-hand rotor 21.

In operation, the ECU 94 controls the hydraulic cylinders 81, 82, 83 to achieve a set-point value in a feedback loop in response to the positions sensed by the sensors 101, 102, 103. The set point values may be determined by a user via a user interface 110 and/or by an automatic system 111.

It should be emphasized that the above-described embodiment of the present disclosure is merely a possible example of implementation, merely set forth for a clear understanding of the principles of the disclosure. Many variations and modifications may be made to the above-described embodiment of the disclosure without departing substantially from the spirit and principles of the disclosure.

The invention claimed is:

1. A combine harvester comprising:
    a frame;
    two axial-flow crop processing rotors mounted to the frame and arranged side-by-side, each rotor having a longitudinal rotation axis;
    an inner support structure located between, and extending parallel to, the two rotors, the inner support structure movably suspended from the frame by a first linkage;
    two outer support structures located outboard of, and extending parallel to, the two rotors, the outer support structures movably suspended from the frame by respective second and third linkages;
    wherein the inner support structure and the two outer support structures are configured to carry first and second pluralities of concave grate segments at a radial distance from the respective rotors; and,
    a concave adjustment system comprising:
        a first actuator coupled to the first linkage and configured to raise and lower the inner support structure, the outer support structures are moveably mounted to the frame by respective second and third linkages, wherein the second linkage and the third linkage each comprise a rockshaft mounted to the frame aligned substantially parallel to the rotation axis, and first and second cranks keyed to the rockshaft and coupled to the associated outer support structure by respective hangers;
        a second actuator connected between the frame and a third crank which is keyed to one of said rockshafts, wherein the second actuator is configured to raise and lower at least one of the two outer support structures.

2. The combine harvester of claim 1, wherein the first linkage comprises fore and aft arms pivotally mounted to the frame and configured to move around respective transverse pivot axes, wherein a distal end of each arm is connected to the inner support structure by a hanger, wherein the first actuator is connected between the frame and one of the fore and aft arms.

3. The combine harvester of claim 1, wherein at least one end of the inner support structure is slidingly connected to the frame by a vertical guide mechanism that constrains horizontal displacement of the inner support structure.

4. The combine harvester of claim 1, wherein the second and third cranks together comprise a bell crank keyed to the rockshaft.

5. The combine harvester of claim 1, wherein the second linkage is coupled mechanically to the third linkage.

6. The combine harvester of claim 1, wherein the second actuator is connected between the frame and the second linkage, and wherein the concave adjustment system further comprises a third actuator connected between the frame and the third linkage.

7. The combine harvester of claim 6, wherein the first actuator extends along a first axis in a vertical longitudinal plane, and wherein the second and third actuators each extend along respective axes in respective vertical transverse planes.

8. The combine harvester of claim 1, wherein each concave grate segment is hinged at an inboard side to the inner support structure and secured at an outboard side to one of the two outer support structures.

9. The combine harvester of claim 8, further comprising a rotor drive system that is drivingly connected to the rotors and configured to drive the two rotors in mutually opposite directions wherein an inboard side of each rotor turns upwardly, and wherein the outboard sides of the concave grate segments correspond to a concave inlet and the inboard sides of the concave grate segments correspond to a concave outlet.

10. The combine harvester of claim 1, wherein the first and second actuators are hydraulic actuators.

11. A combine harvester comprising:
a frame;
two axial-flow crop processing rotors mounted to the frame and arranged side-by-side, each rotor having a longitudinal rotation axis;
an inner support structure located between, and extending parallel to, the two rotors, the inner support structure movably suspended from the frame by a first linkage;
two outer support structures located outboard of, and extending parallel to, the two rotors, the outer support structures movably suspended from the frame by respective second and third linkages;
wherein the inner support structure and the two outer support structures are configured to carry first and second pluralities of concave grate segments at a radial distance from the respective rotors; and,
a concave adjustment system comprising:
a first hydraulic actuator coupled to the first linkage and configured to raise and lower the inner support structure;
a second hydraulic actuator coupled to one of the second and third linkages and configured to raise and lower at least one of the two outer support structures; and
a hydraulic control system comprising:
the first and second hydraulic actuators; and
first and second pressure relief valves, each valve hydraulically connected to a respective one of the first and second hydraulic actuators, wherein the first and second pressure relief valves permit movement of the inboard and outboard sides of the concave gate segments respectively in response to slugs of crop material passing adjacent the concave grate segments.

12. The combine harvester of claim 6, wherein:
each of the concave grate segments are hinged at an inboard side to the inner support structure and secured at an outboard side to one of the two outer support structures;
the first, second, and third actuators are hydraulic actuators;
the concave adjustment system further comprises a hydraulic control system which includes the first, second, and third hydraulic actuators, and first, second, and third pressure relief valves each being connected hydraulically to a respective one of the first, second, and third hydraulic actuators; and
the first, second, and third pressure relief valves permit movement of the inboard and two outboard sides respectively in response to slugs of crop material passing around the concave grate segments.

13. The combine harvester of claim 1, wherein the concave adjustment system further comprises an electronic control module configured to control the first and second actuators.

14. The combine harvester of claim 13, wherein the concave adjustment system further comprises a first position sensor mounted to the frame and in communication with the control module, wherein the first position sensor is mechanically coupled to the first linkage and is configured to generate a signal representative of a current position of the inner support structure.

15. The combine harvester of claim 13, wherein the concave adjustment system further comprises a second position sensor mounted to the frame and in communication with the control module, wherein the second position sensor is mechanically coupled to one of the second and third linkages and is configured to generate a signal representative of a current position of the outboard side of one of the two outer support structures.

* * * * *